United States Patent [19]

Ohya et al.

[11] Patent Number: 4,495,249
[45] Date of Patent: Jan. 22, 1985

[54] HEAT SHRINKABLE MULTI-LAYERED LAMINATE FILM

[75] Inventors: Masaki Ohya; Yoshiharu Nishimoto; Kengo Yamazaki, all of Iwaki, Japan

[73] Assignee: Kureha Kagaku Kogyo Kabushiki Kaisha, Nihonbashi, Japan

[21] Appl. No.: 464,018

[22] Filed: Feb. 4, 1983

[30] Foreign Application Priority Data

Feb. 19, 1982 [JP] Japan .................................. 57-25691

[51] Int. Cl.³ ...................... B32B 27/30; B32B 27/32
[52] U.S. Cl. ..................................... 428/516; 428/520; 428/913; 428/522; 215/1 C; 426/129
[58] Field of Search ................. 428/516, 913, 520, 522

[56] References Cited

U.S. PATENT DOCUMENTS

| 4,058,647 | 11/1977 | Inoue et al. | 428/474 |
| 4,064,296 | 12/1977 | Bornstein et al. | 428/35 |
| 4,182,457 | 1/1980 | Yamada et al. | 215/1 |
| 4,217,161 | 8/1980 | Yamada et al. | 156/242 |
| 4,228,215 | 10/1980 | Hein et al. | 428/216 |
| 4,281,045 | 7/1981 | Sumi et al. | 428/516 |
| 4,424,243 | 1/1984 | Nishimoto et al. | 428/516 X |

FOREIGN PATENT DOCUMENTS

| 65379 | 6/1978 | Japan | 428/516 |
| 63484 | 6/1978 | Japan | 428/516 |
| 13582 | 2/1979 | Japan | 428/516 |
| 130685 | 10/1979 | Japan | 428/516 |
| 1510116 | 5/1978 | United Kingdom . | |
| 1510115 | 5/1978 | United Kingdom . | |
| 2037660 | 7/1980 | United Kingdom . | |

OTHER PUBLICATIONS

Japanese Patent Appl. No. 49-76843.

Primary Examiner—Patricia C. Ives
Attorney, Agent, or Firm—Wegner & Bretschneider

[57] ABSTRACT

Disclosed herein is a heat-shrinkable multi-layered laminate film comprising a core layer made of a saponified copolymer of ethylene and vinyl acetate, two outer layers made of a mixture of a copolymer of ethylene and vinyl acetate having a crystal melting point of 85° to 103° C. and a copolymer of propylene and ethylene having a crystal melting point of 126° to 155° C. or a linear low-density polyethylene having a crystal melting point of 110° to 125° C. and two adhesive layers disposed between the core layer and the two outer layers, the multi-layered laminate film being excellent in gas-barrier property, oil resistance and peel-resistance of the sealed parts in the heat shrinkage and suitable for heat-shrinking packaging of foodstuffs, particularly for vacuum heat-packaging of foodstuffs.

6 Claims, 1 Drawing Figure

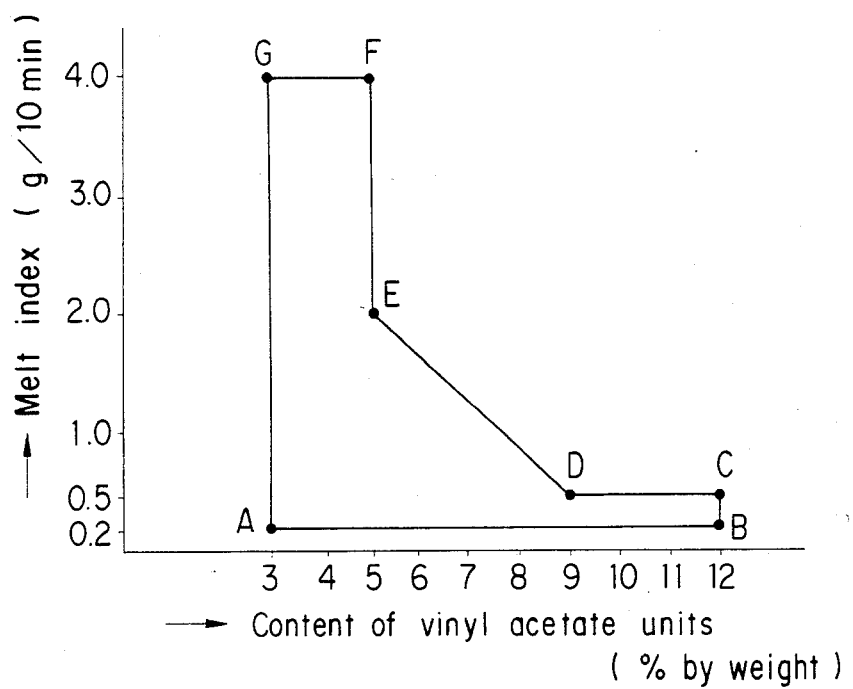

HEAT SHRINKABLE MULTI-LAYERED LAMINATE FILM

BACKGROUND OF THE INVENTION

The present invention relates to a heat-shrinkable laminate film comprising a core layer made of a saponified copolymer of ethylene and vinyl acetate, two outer layers made of a material selected from mixtures of a copolymer of ethylene and vinyl acetate and a linear low-density polyethylene or a copolymer of propylene and ethylene and two adhesive layers, the ratio of the weight of the copolymer of ethylene and vinyl acetate to the total weight of the polymers of the two outer layers being higher than 0.4, more particularly relates to a heat-shrinkable laminate film excellent in gas-barrier property, oil-resistance and peel-resistance of the sealed parts in the heat shrinkage (hereinafter referred to as peel-resistance), comprising a core layer made of a saponified copolymer of ethylene and vinyl acetate, two outer layers made of a resin selected from mixtures of 80 to 30% by weight of a copolymer of ethylene and vinyl acetate having a crystal melting point in a range of 85° to 103° C. and 20 to 70% by weight of a linear low-density polyethylene having a crystal melting point in a range of 110° to 125° C. or a copolymer of propylene and ethylene having a crystal melting point of 126° to 155° C., and two adhesive layers disposed between the core layer and the outer layers, the ratio of the weight of the copolymer of ethylene and vinyl acetate to the total weight of the polymers of the two outer layers being larger than 0.4.

For packaging irregularly shaped fatty foodstuffs such as raw meats, processed meats, cheeses, etc., a heat-shrinkable packing film material is most simple and convenient. Since such a packaged foodstuff is required to be preserved safely for a long time period, not only the gas-barrier property but also the oil-resistance and the peel-resistance are required for the film material used in such heat-sealing packaging.

Namely, in the case where fatty foodstuffs are packaged in such a film material and the thus packaged foodstuffs are sterilized, there has been frequently observed that the film softened by the fats and the heat is thinly stretched resulting in breaking or that the thus softened film is broken at the sealed part or the neighborhood thereof by the heat-shrinking stress generated during the sterilization. Accordingly, a heat-shrinkable film having the excellent gas-barrier property, the high oil-resistance and peel-resistance have been demanded from the field of food-packaging industry.

Hitherto, as a heat-shrinkable film having the excellent gas-barrier property, in which a saponified copolymer of ethylene and vinyl acetate is used as the gas-barrier layer, the laminate film comprising polyolefin, a saponified copolymer of ethylene and vinyl acetate and a polyamide (hereinafter referred to as the laminate film of polyolefin/polyamide/saponified copolymer of ethylene and vinyl acetate) disclosed in Japanese patent application laying open No. 56-136365 (1981) and the laminate film comprising an ionomer, a saponified copolymer of ethylene and vinyl acetate and a polyamide or a copolymer of ethylene and vinyl acetate (hereinafter referred to as the laminate film of ionomer/saponified copolymer of ethylene and vinyl acetate/polyamide or the laminate film of ionomer/saponified copolymer of ethylene and vinyl acetate/copolymer of ethylene and vinyl acetate) disclosed in Japanese patent application laying open No. 56-89444 (1981), etc. have been known.

In the preparation of the laminate film of polyolefin/polyamide/saponified copolymer of ethylene and vinyl acetate, the adhesion of the polyolefin layer and the polyamide layer is carried out by an extra-die adhesion method, and accordingly it is difficult to quench the material, and so, the crystallization of polyolefin proceeds to give a bad effect on the stretchability of the product. In addition, in the case of using such a resin (for instance, an ordinary polyethylene or a copolymer of propylene and ethylene) of a high crystal melting point and of a high crystallizability, the temperature for stretching becomes high and it is impossible to process such a resin into a heat-shrinkable film of a heat-shrinkage of larger than 15% at 90° C.

On the other hand, in the case where a copolymer of ethylene and vinyl acetate of a relatively low in crystallization is used, the oil-resistance and the peel-resistance are reduced and the thus prepared laminate film is unsuitable for packaging materials containing oils and fats such as fatty foodstuffs. In addition, because of the hygroscopic property of the saponified copolymer of ethylene and vinyl acetate and the polyamide, the gas-barrier property of the saponified copolymer of ethylene and vinyl acetate is remarkably reduced during heat-shrinkage and sterilization which are carried out while utilizing a hot water, the fact being a problem.

In the laminate film of ionomer/saponified copolymer of ethylene and vinyl acetate/polyamide, since the ionomer is also hygroscopic as well as the polyamide, there are cases where the layer of saponified copolymer of ethylene and vinyl acetate becomes a hygroscopic state indirectly via the layer of polyamide resulting in the reduction of the gas-barrier property of the laminate film.

In addition, in the case where the ionomer is used for preparing the inner layer (one of the outer layers of the laminate film, and becomes the inner layer after the packaging has been completed), it occasionally reduces the peel-resistance.

The laminate film of ionomer/saponified copolymer of ethylene and vinyl acetate/copolymer of ethylene and vinyl acetate causes frequently the problem of poor oil-resistance, poor peel-resistance and poor gas-barrier property as the laminate films known.

As stated above, in the case where a low-density polyethylene or an ionomer is used for preparing both of the outer layers, particularly the peel-resistance has been insufficient. On the other hand, in the case where a copolymer of ethylene and vinyl acetate is used for the purpose, the oil-resistance of the laminate film has been insufficient. In another case where a polymer of a high crystal melting point such as copolymer of ethylene and propylene and polypropylene is used as the sole material for the outer layer, although the peel-resistance and the oil-resistance of the laminate film is improved, it is difficult to stretch the layer for obtaining the heat-shrinkage at 90° C. of higher than 15% because of the lack of stretchability of such a polymer.

In addition, even in the case where the layer of a saponified copolymer of ethylene and vinyl acetate is laminated with a layer of a hygroscopic resin, the gas-barrier property of the thus prepared laminate film is frequently reduced during the heat-shrinkage and the sterilization.

Accordingly, the development of a heat-shrinkable laminate film excellent in oil-resistance, peel-resistance and gas-barrier property has been keenly demanded in the field of food-packaging industry.

SUMMARY OF THE INVENTION

In an aspect of the present invention, there is provided a heat-shrinkable laminate film excellent in gas-barrier property, oil-resistance and peel-resistance, comprising a core layer made of a saponified copolymer of ethylene and vinyl acetate, two outer layers made of a resin selected from mixtures of 80 to 30% by weight of a copolymer of ethylene and vinyl acetate having a crystal melting point in a range of 85° to 103° C. and 20 to 70% by weight of a linear low-density polyethylene having a crystal melting point in a range of 110° to 125° C. or a copolymer of propylene and ethylene having a crystal melting point of 126° to 155° C., and two adhesive layers disposed between the core layer and the outer layers, the ratio of the weight of the copolymer of ethylene and vinyl acetate to the total weight of the polymers of the two outer layers being larger than 0.4.

BRIEF EXPLANATION OF DRAWING

In the drawing, FIGURE shows the relationship between the melt-index (g/10 min.) and the content (% by weight) of vinyl acetate units of the copolymer of ethylene and vinyl acetate which is preferably used in the present invention, while taking the melt-index thereof in the ordinate and taking the content of vinyl acetate units thereof in the abscissa.

DETAILED EXPLANATION OF THE INVENTION

The present invention relates to a heat-shrinkable laminate film excellent in gas-barrier property, oil-resistance and peel-resistance, comprising a core layer made of a saponified copolymer of ethylene and vinyl acetate, two outer layers made of a resin selected from mixtures of 80 to 30% by weight of a copolymer of ethylene and vinyl acetate having a crystal melting point in a range of 85° to 103° C. and 20 to 70% by weight of a linear low-density polyethylene having a crystal melting point in a range of 110° to 125° C. or a copolymer of propylene and ethylene having a crystal melting point of 126° to 155° C., and two adhesive layers disposed between the core layer and the outer layers, the ratio of the weight of the copolymer of ethylene and vinyl acetate to the total weight of the polymers of the two outer layers being larger than 0.4. More particularly, the present invention relates to a heat-shrinkable laminate film excellent in gas-barrier property, oil-resistance and peel-resistance, comprising a core layer made of a saponified copolymer of ethylene and vinyl acetate, two outer layers made of a resin selected from the group consisting of mixtures of 80 to 30% by weight of a copolymer of ethylene and vinyl acetate having a crystal melting point in a range of 85° to 103° C. and 20 to 70% by weight of a linear low-density polyethylene having a crystal melting point in a range of 110° to 125° C. or a copolymer of propylene and ethylene having a crystal melting point of 126° to 155° C., and two adhesive layers disposed between the core layer and the outer layers, the ratio of the weight of the copolymer of ethylene and vinyl acetate to the total weight of the polymers of the two outer layers being larger than 0.4, and the copolymer of ethylene and vinyl acetate contained in at least one of the outer layers has a relationship between the content (% by weight) of vinyl acetate units of the copolymer and the melt-index (g/10 min) thereof falling in the range made of the seven points A(3, 0.2), B(12, 0.2), C(12, 0.5), D(9, 0.5), E(5, 2.0), F(5, 4.0) and G(3, 4.0) on a plane having said content of vinyl acetate as abscissa and said melt-index as ordinate.

The characteristic in the construction of the heat-shrinkable laminate film according to the present invention is that the outer layer thereof comprises a mixture of 80 to 30% by weight of a copolymer of ethylene and vinyl acetate having a crystal melting point of 85° to 103° C. and 20 to 70% by weight of a copolymer of propylene and ethylene having a crystal melting point of 110° to 125° C. or a linear low-density polyethylene having a crystal melting point of 126° to 155° C. Because of the property of difficulty absorbing moisture, copolymer of propylene and ethylene and linear low-density polyethylene prevent the reduction of the gas-barrier property after laminating as a component of the outer layer and in the same time, it has become possible to improve the heat-shrinkage by selecting the suitable mixing ratio of the components.

The copolymer of propylene and ethylene for use in the outer layer of the laminate film according to the present invention shows a crystal melting point of 126° to 155° C. and preferably, contains 1 to 7% by weight of ethylene units and is excellent in thermal resistance and oil-resistance.

Also the linear low-density polyethylene for use in the same purpose shows a crystal melting point of 110° to 125° C. and is excellent in thermal resistance and oil-resistance and the linear low-density polyethylene is a copolymer of ethylene and an alpha-olefin of not more than 18 carbon atoms such as butene-1, pentene-1, 4-methylpentene-1, hexene-1, octene-1, etc., of a ratio of copolymerization of 99.0:1.0 to 70:30 by weight. These copolymers are obtained by copolymerization while using a catalyst mainly comprising transition metal(s). As the commercialized linear low-density polyethylene, for instance, ULTZEX ® (manufactured by MITSUI Petrochem. Co., Ltd.), G-RESIN ® (manufactured by Union Carbide Corporation), DOWREX ® (manufactured by Dow Chem. Co.), etc. are used. Particularly, the laminate film provided with the linear low-density polyethylene as an outer layer is excellent in peel-resistance.

As the copolymer of ethylene and vinyl acetate to be mixed with the copolymer of propylene and ethylene or the linear low-density polyethylene, one of those of crystal melting point of 85° to 103° C. is used.

In addition, in the case where one of the two outer layers of a laminate film is sealed together with the same layer (clasp-type sealing), it is preferable that the outer layer is made of the mixture of the copolymer of ethylene and vinyl acetate showing a melt-index in a range of 0.2 to 4.0 (unit: g/10 min) and having a content of vinyl acetate units of 3 to 12% by weight of the copolymer of ethylene and vinyl acetate and the relationship between the melt-index and the content of vinyl acetate units falling in the heptagonal range surrounded by the linear lines AB, BC, CD, DE, EF, FG and GA shown in the annexed drawing of FIGURE. On the other hand, in the case where one of the two outer layers of a laminate film is sealed together with another outer layer of the same laminate film, for instance, in the case where a material is packaged in an envelope-shaped sealing, it is preferable that both of the two outer layers of a laminate film are made of the material above-mentioned.

FIGURE of the drawing shows the relationship between the melt-index taken as ordinate and the content of vinyl acetate units taken as abscissa, and the heptagonal range has the respective seven points, A(3, 0.2), B(12, 0.2), C(12, 0.5), D(9, 0.5), E(5, 2.0), F(5, 4.0) and G(3, 4.0).

In addition, the melt-index of the polymers used according to the present invention is measured by the method shown in ASTM D-1238, and the crystal melting point of the polymers is the maximum temperature on the melting curve obtained by determining the melting property of the polymer by the use of a differential scanning calorimeter (for instance, a type IB made by Perkin & Elmer Corp.).

The saponified copolymer of ethylene and vinyl acetate according to the present invention contains 20 to 80 mol % of ethylene units and has a saponification degree of not less than 50 mol %.

Every pair of the copolymer of propylene and ethylene, the linear low-density polyethylene, the copolymer of ethylene and vinyl acetate and the saponified copolymer of ethylene and vinyl acetate are substantially incompatible to each other, and accordingly the layers of the laminate film prepared from these polymers are apt to be exfoliated, and particularly, in the present invention, because of the many cases of necessitating the immersion of the packaged foodstuffs into hot water for a long time period for the purpose of sterilization, the weak adhesion between the layers of the laminate film can not hold the layers when the film is immersed in the hot water resulting in exfoliation to impair the appearance and reduce the gas-barrier property.

Accordingly, in the preparation of the laminate film according to the present invention, it is necessary to provide a tenacious layer made of an adhesive between the outer layers and the core layer to prevent the exfoliation of the layers. As the adhesive, polyolefin modified by a carboxylic acid, copolymers of ethylene and vinyl acetate, and copolymers of ethylene and ethyl acrylate are used and the mixtures thereof can be used.

In the multi-layered laminate film according to the present invention, the thickness of each of the outer layers is preferably larger than 18% of the total thickness of the multi-layered laminate film. The thickness of one of the outer layers may be the same or different from that of the other of them. In the case where the thickness of the outer layer which is used as the heat-sealing layer in the operation of packaging (at least one of the outer layers of a laminate film in the case where packaging is carried out by using a clasp-shaped sealing and on the other hand, the two outer layers of a laminated film in the case where packaging is carried out by using an envelope-shaped sealing) is below 18% of the total thickness of the laminate film, there may be a fear of causing problems concerning the peel-resistance.

Concerning the thickness of the core layer, it is necessary that the thickness of the core layer is at least 2 microns in order to provide the gas-barrier property to the laminate film and it is preferably less than 10 microns, because it is difficult to stretch the laminate film in the case of larger than 10 microns.

Concerning the total thickness of the laminate film, the thickness of 10 to 80 microns is usually adopted for obtaining a heat-shrinkage of larger than 15% at 90° C. of the laminate film.

The laminate film according to the present invention can be prepared by the known process. Namely, while using a number of extruders corresponding to the number of the layers of the laminate film and using a circular die similar to that used in Japanese patent application laying open No. 53-82888 (1978), a tubular shaped and laminated material is extruded, and on the other hand, using a known T-die, a flat-type material is extruded and the predetermined number and combination of the flat layers are laminated.

The tubular shaped laminate film thus extruded is once quenched just under the die and thereafter folded by a pair of nip-rolls, and after heated to a predetermined temperature, it is biaxially stretched to be a heat-shrinkable cylindrically-shaped laminate film. The flat-type laminate material is once quenched by the chilling-rolls just under the T-die, and after heated to a predetermined temperature, it is successively stretched biaxially or simultaneously stretched biaxially to be a heat-shrinkable flat-type laminate film.

Because of the excellent oil-resistance, peel-resistance and gas-barrier property, the heat-shrinkable laminate film according to the present invention is used in packaging various kinds of foodstuffs. It is particularly used suitably for packaging the fatty foodstuffs which necessitate the sterilization at a high temperature with an excellent result.

The present invention will be more precisely explained while referring to Examples as follows.

However, the present invention is not restricted to Examples under mentioned. From the foregoing description, one skilled in the art can easily ascertain the essential characteristics of this invention, and without departing from the spirit and scope thereof, can make various changes and modifications of the invention to adapt it to various usages and conditions.

EXAMPLES 1 TO 6

A number of the resins shown in Table 1 were extruded by the number of extruders corresponding to the number of the resins, respectively, and the thus extruded materials were introduced into a common circular die to extrude a tubular shaped laminate material, and the material is cooled in a cooling bath at a temperature of 15° to 25° C. to be a continuous tube of 240 mm in folded width and 70 to 320 microns in thickness. After introducing a soy-bean oil into the thus cooled tubular material for preventing the adhesion of both the two inner surfaces of the tubular shaped material, the tubular material was transferred into a hot water tank and/or an oven at an adjusted temperature shown in Table 2-1 at a speed of 5 m/min for heating for about 15 sec. and is passed through a pair of the first nip-rolls. The thus transferred tubular shaped material was stretched 2 times in the longitudinal direction and 2,3 times in the direction of the diameter of the tubular material by an introduced air thereinto with appearance of inflation during passing through the second pair of nip-rolls which rotated at a linear velocity of 11 m/min while being cooled by an atmosphere at an ordinary temperature. The thus obtained biaxially stretched film is about 550 mm in folded width and about 15 to 70 microns in thickness.

Table 1 shows the physical properties of the polymers used for preparing the laminate film, and Tables 2-1 and 2-2 show the layer-construction of the thus obtained laminate film and the results of physical property tests of the laminate film, Table 3 showing the methods for testing the physical properties of the laminate film.

As seen clearly in Tables 2-1 and 2-2, every laminate film prepared according to the present invention in Examples 1 to 6 shows an excellent result. Comparative Example 1 shows that the thickness of the layer made of a saponified copolymer of ethylene and vinyl acetate is excessively large as 12 microns resulting in impossibility of stretching thereof. Comparative Example 2 shows an example of using a linear low-density polyethylene singly resulting in a laminate film of insufficient in heat-shrinkage at 90° C., thus unsuitable for the purpose of the present invention. Comparative Example 3 shows an example of insufficient amount of linear low-density polyethylene and copolymer of propylene and ethylene in the mixture for the outer layers resulting in insufficient oil-resistance and peel-resistance. Comparative Example 4 shows a case of too large content of linear low-density polyethylene in the mixture for the outer layers resulting in the insufficient amount of the copolymer of ethylene and vinyl acetate in the mixture for the outer layers and in incapability of stretching.

TABLE 1

| Polymers | Kinds and physical properties of the Resins | | | | | |
|---|---|---|---|---|---|---|
| | Symbol of the polymer | Melt-index of the polymer (g/10 min) | Density | Content of vinyl acetate (% by weight) | Crystal melting point (°C.) | Notes |
| Saponified copolymer of ethylene and vinyl acetate*1 | A | — | — | — | — | |
| Linear low-density polyethylene*2 | B | 2.5 | 0.922 | — | 122 | |
| Copolymer of propylene and ethylene | C | 1.3 | 0.900 | — | 139 | |
| Copolymer of ethylene and vinyl acetate | $D_1$ | 0.5 | — | 5 | 97 | |
| Copolymer of ethylene and vinyl acetate | $D_2$ | 1.5 | — | 6 | 95 | |
| Copolymer of ethylene and vinyl acetate | $D_3$ | 0.5 | — | 10 | 91 | |
| Copolymer of ethylene and vinyl acetate | $D_4$ | 0.35 | — | 12 | 85 | |
| Copolymer of ethylene and vinyl acetate | $D_5$ | 3 | — | 15 | 82 | used as an adhesive |
| Copolymer of ethylene and ethyl acrylate*3 | E | 6 | — | — | 90 | used as an adhesive |
| Modified polyethylene by carboxylic acid | F | 15 | — | — | — | used as an adhesive |

References:
*1Commercial name of EVAL ® (made by KURARE), content of ethylene units of 45 mol %.
*2Commercial name of ULTZEX ® (made by MITSUI Petrochem.)
*3Content of ethyl acrylate units of 18% by weight.

TABLE 2-1

| | Constitution of Layers of the Laminate Film | | | | | | |
|---|---|---|---|---|---|---|---|
| | Construction of each layer (thickness, micron) | | | | | Wt. % of ethylene-vinyl acetate copolymer in outer layer | Temperature of hot water and oven (°C.) |
| EXAMPLE NO. | Outer (A) | Adhesive | Core | Adhesive | Outer (B) | | |
| 1 | B:$D_2$ = 4:6 (14)*1 | F (2) | A (3) | F (2) | B:$D_1$ = 3:7 (29) | 67 | 94–96*2 and not used |
| 2 | B:$D_2$ = 4:6 (14) | F (2) | A (3) | F (2) | C:$D_1$ = 3:7 (29) | 67 | 94–96 and not used |
| 3 | B:$D_3$ = 4:6 (11) | F:$D_5$ = 9:1 (2) | A (6) | F:$D_5$ = 9:1 (2) | B:$D_3$ = 3:7 (29) | 67 | 96–98 and 105 |
| 4 | B:$D_3$ = 7:3 (5) | F (2) | A (2) | F (2) | C:$D_4$ = 4:6 (6) | 46 | 96–98 and 105 |
| 5 | C:$D_2$ = 4:6 (14) | F:$D_4$ = 8:2 (2) | A (3) | F:$D_4$ = 8:2 (2) | B:$D_1$ = 2:8 (29) | 73 | 94–96 and not used |
| 6 | C:$D_3$ = 2:8 (25) | F:E = 9:1 (3) | A (9) | F:E = 9:1 (3) | B:$D_3$ = 2:8 (30) | 80 | 96–98 and 120 |
| COMPARATIVE 1 | C:$D_3$ = 2:8 (9) | F (2) | A (12) | F (2) | B:$D_3$ = 2:8 (25) | 80 | — |
| COMPARATIVE 2 | B (14) | F (2) | A (3) | F (2) | B (20) | 0 | 96–98 and 120 |
| COMPARATIVE 3 | C:$D_3$ = 1:9 (14) | F (2) | A (3) | F (2) | B:$D_3$ = 1:9 (29) | 90 | 93–95 and not used |
| COMPARATIVE 4 | B:$D_2$ = 8:2 (14) | F (2) | A (3) | F (2) | B:$D_1$ = 6:4 (29) | 33 | — |

Notes:
*1The formula means that the polymer B and the polymer $D_2$ were mixed at a weight ratio of 4:6 and the mixture was processed to be a layer of 14 microns in thickness.
*2(no) means that the heating was carried out only in the bath without using the oven.

TABLE 2-2

| | | Physical properties of the Laminate Film | | | | |
|---|---|---|---|---|---|---|
| EXAMPLE NO. | Stretch-ability*3 | Percentage of heat-shrinkage (L/T) | Oil-resistance*4 | | Peel-resistance | Gas-barrier property*5 |
| | | | Outer layer (A) | Outer layer (B) | | |
| 1 | yes | 32/34 | excellent | excellent | excellent | 78 |
| 2 | yes | 31/34 | excellent | excellent | good | 78 |
| 3 | yes | 25/28 | excellent | excellent | excellent | 40 |
| 4 | yes | 26/29 | excellent | excellent | good | 110 |
| 5 | yes | 33/35 | excellent | excellent | excellent | 78 |
| 6 | yes | 16/18 | excellent | excellent | excellent | 24 |
| COMPARATIVE 1 | no | — | — | — | — | — |
| COMPARATIVE 2 | yes | 6/8 | excellent | excellent | excellent | 78 |
| COMPARATIVE 3 | yes | 33/37 | poor | poor | poor | 78 |
| COMPARATIVE 4 | no | — | — | — | — | — |

Notes:
*3Stretchability: yes means that the film could be stretched and no means that the film could not be stretched.
*4Oil resistance: excellent means that the specimen passed the oil-resistance test shown in Table 3.
*5Gas-barrier property: the amount of oxygen passed through the specimen at 30° C. and 100% R.H.

TABLE 3

Methods for determining the physical properties of the specimen

| Item | Method of determination |
|---|---|
| Percentage of heat shrinkage in hot water | A piece of the laminated film, 10 × 10 cm in size was cut out from the laminated film, and immersed into a hot water at 90° C. for one minute at a relaxed state. Thereafter, the shrinkages of the specimen in length and in width, respectively were determined and expressed as the percentages to the original size. Test was carried out on 20 pieces and the mean value was shown in Table 2-2. |
| Oil-resistance | On the surface of hot water at 90° C. in a bath, a small amount of oil was intentionally floated, and a vacuum-packaged roast pork in a specimen of the laminated film was immersed into the hot water for 10 min. Thereafter, the packaged pork meat was cooled and the presence or absence of any damage on the outermost layer of the laminate film. |
| Peel-resistance | Two specimens of a laminate film was heat-sealed, and the thus heat-sealed specimen was stretched on a frame with a margin of 5%. After painting the specimen with lard, the specimen was immersed into hot water at 85° C., and the time until when the specimen was broken at the sealed part or its vicinity is measured. The specimen showing the time larger than 90 sec was judged as excellent, larger than 60 sec was judged as good, and the specimen showing the time less than 10 sec was judged as poor. |

What is claimed is:

1. A heat-shrinkable laminate film excellent in gas-barrier property, oil-resistance and peel-resistance, comprising a core layer made of a saponified copolymer of ethylene and vinyl acetate, two outer layers made of a resin selected from mixtures of 80 to 30% by weight of a copolymer of ethylene and vinyl acetate having a crystal melting point in a range of 85° to 103° C. and 20 to 70% by weight of a linear low-density polyethylene having a crystal melting point in a range of 110° to 125° C. or a copolymer of propylene and ethylene having a crystal melting point of 126° to 155° C., and two adhesive layers disposed between the core layer and the outer layers, the ratio of the weight of the copolymer of ethylene and vinyl acetate to the total weight of the polymers of the two outer layers being larger than 0.4.

2. A heat-shrinkable laminate film according to claim 1, wherein at least one of said outer layers contains said linear low-density polyethylene.

3. A heat-shrinkable laminate film according to claim 1, wherein said saponified copolymer of ethylene and vinyl acetate contains 20 to 80 mol % of ethylene units and has a saponification degree of not less than 50 mol %.

4. A heat-shrinkable laminate film according to claim 1, wherein said linear low-density polyethylene is a copolymer of ethylene and an alpha-olefin having not more than 18 carbons of a ratio of copolymerization of 99.0:1.0 to 70:30 by weight.

5. A heat-shrinkable laminate film according to claim 1, wherein said copolymer of propylene and ethylene contains 1 to 7% by weight of ethylene units.

6. A heat-shrinkable laminate film according to any one of claims 1 to 5, wherein said copolymer of ethylene and vinyl acetate contained in at least one of said outer layers is such that the content of vinyl acetate units thereof defined by percentage by weight of said copolymer and the melt index of said copolymer defined by g/10 min are expressed by x-coordinate and y-coordinate, respectively of one of the points falling within a heptagone defined by the following seven vertices:

A(3,0.2), B(12,0.2)C(12,0.5), D(9,0.5), E(5,2.0), F(5,4.0) and G(3,4.0), on a plane defined by an abscissa representing said content of vinyl acetate in percentage by weight of said copolymer and an ordinate representing said melt index in g/10 min.

* * * * *